United States Patent [19]
Sutton et al.

[11] Patent Number: 5,539,258
[45] Date of Patent: Jul. 23, 1996

[54] ELECTRICAL POWER GENERATING ARRANGEMENT HAVING ENGINE THROTTLE AND TRANSMISSION RATIO CONTROL RESPONSIVE TO LOAD POWER DEMAND

[75] Inventors: Jeffrey A. Sutton, Solihull; Iain J. Tebbutt, Ashby De La Zouch, both of England

[73] Assignee: British Gas plc, London, England

[21] Appl. No.: 296,911

[22] Filed: Aug. 31, 1994

[30] Foreign Application Priority Data

Sep. 15, 1993 [GB] United Kingdom .................. 9319130

[51] Int. Cl.⁶ ................................ F02N 11/06; H02P 9/04
[52] U.S. Cl. ................................. 290/40 R; 290/40 B
[58] Field of Search .............................. 290/40 A, 40 B, 290/40 C, 40 R; 322/20, 22, 24, 29, 40

[56] References Cited

U.S. PATENT DOCUMENTS

| | | | |
|---|---|---|---|
| 4,262,209 | 4/1981 | Berner | 290/7 |
| 4,307,690 | 12/1981 | Rau et al. | 123/353 |
| 4,322,630 | 3/1982 | Mezera et al. | 290/40 C |
| 4,888,493 | 12/1989 | Fluegel | 290/4 C |
| 4,959,896 | 10/1990 | Bolin et al. | 290/40 B |
| 4,991,400 | 2/1991 | Wilkinson | 62/228.4 |
| 5,068,591 | 11/1991 | Hoegberg et al. | 322/29 |

FOREIGN PATENT DOCUMENTS

| | | |
|---|---|---|
| 0041585 | 12/1981 | European Pat. Off. . |
| 1117204 | 11/1961 | Germany . |
| 1126007 | 3/1962 | Germany . |
| 3402015 | 7/1985 | Germany . |
| 3739726 | 9/1989 | Germany . |
| WO94/14000 | 6/1994 | WIPO . |

Primary Examiner—Steven L. Stephan
Assistant Examiner—Christopher Cuneo
Attorney, Agent, or Firm—Oblon, Spivak, McClelland, Maier & Neustadt

[57] ABSTRACT

An electrical power generating arrangement (for example, in a combined heat and power system) in which electric power for supply to mains or grid is output from a generator driven via a continuously variable transmission (C.V.T.) by an internal combustion engine having a throttle. The throttle opening and ratio of the C.V.T. are controlled by a controller comprising a computer programmed with an engine map which is consulted by the computer when there is a change in an external electrical load power demand. For any load, the map indicates at which speed the engine should be run for optimum engine efficiency, the throttle opening is varied to attain that speed, and the controller varies the ratio of the C.V.T. to a value consistent with the desired engine speed.

7 Claims, 6 Drawing Sheets

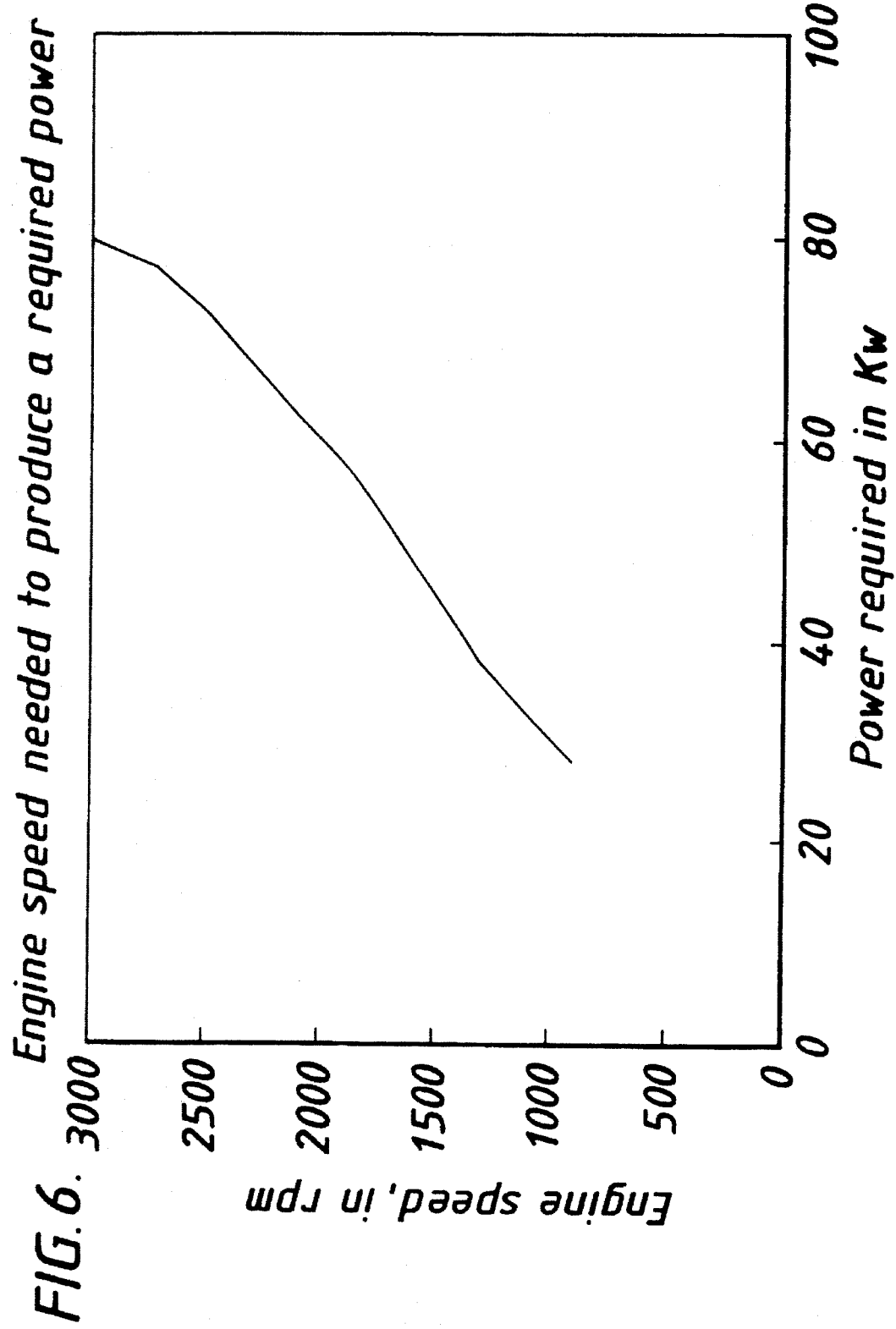

ELECTRICAL POWER GENERATING ARRANGEMENT HAVING ENGINE THROTTLE AND TRANSMISSION RATIO CONTROL RESPONSIVE TO LOAD POWER DEMAND

BACKGROUND OF THE INVENTION

This invention concerns an electrical power generating arrangement from which the electrical power output is to be connected to the electrical mains.

The electrical power generating arrangement may be included in a combined heat and power system (CHP), though it need not necessarily be.

In some known CHP systems the electrical generator feeding its output into the electrical mains or grid is rotated at substantially constant speed by a reciprocating internal combustion engine giving a substantially constant speed rotary output driving the generator. Since the engine rotates at a substantially constant number of revolutions per minute (r.p.m.) whatever the electrical power demand from the generator by an external circuit being supplied, the engine is not necessarily operating at optimum efficiency which optimum efficiency may occur at a lower r.p.m. than the aforesaid constant r.p.m. for low power demand or at a higher r.p.m. for higher power demand. Also best advantage cannot be taken of using high revving high performance engines produced for motor vehicles.

OBJECT OF THE INVENTION

An object of the invention is to provide an electrical power generating arrangement from which the electrical power output is to be connected to the electrical mains or grid in which the arrangement is capable of being used with the engine running at variable speed.

SUMMARY OF THE INVENTION

According to the invention there is provided an electrical power generating arrangement from which the electrical power output is to be connected to the electrical mains, said electrical power generating arrangement comprising a reciprocating internal combustion engine and an electrical power generator rotatably driven by rotary drive derived from said engine and applied to said generator through a drive line comprising a continuously variable transmission, and the speed of said engine being variable as a function of variation in electric power output from the generator.

BRIEF DESCRIPTION OF THE DRAWINGS

The invention will now be further described, by way of example, with reference to the accompanying drawings in which:

FIG. 6 shows a graph (derived from data used to produce the graphs in FIGS. 2 to 5) of variation in the engine speed in r.p.m. plotted against variation in electrical power required from the generator (i.e. the electrical power required to meet the electrical load demand from the generator), the graph indicating the engine speed at which the engine is operating at substantially optimum efficiency to drive the generator to produce the required electrical power output.

DESCRIPTION OF THE PREFERRED EMBODIMENT

Figure 1:
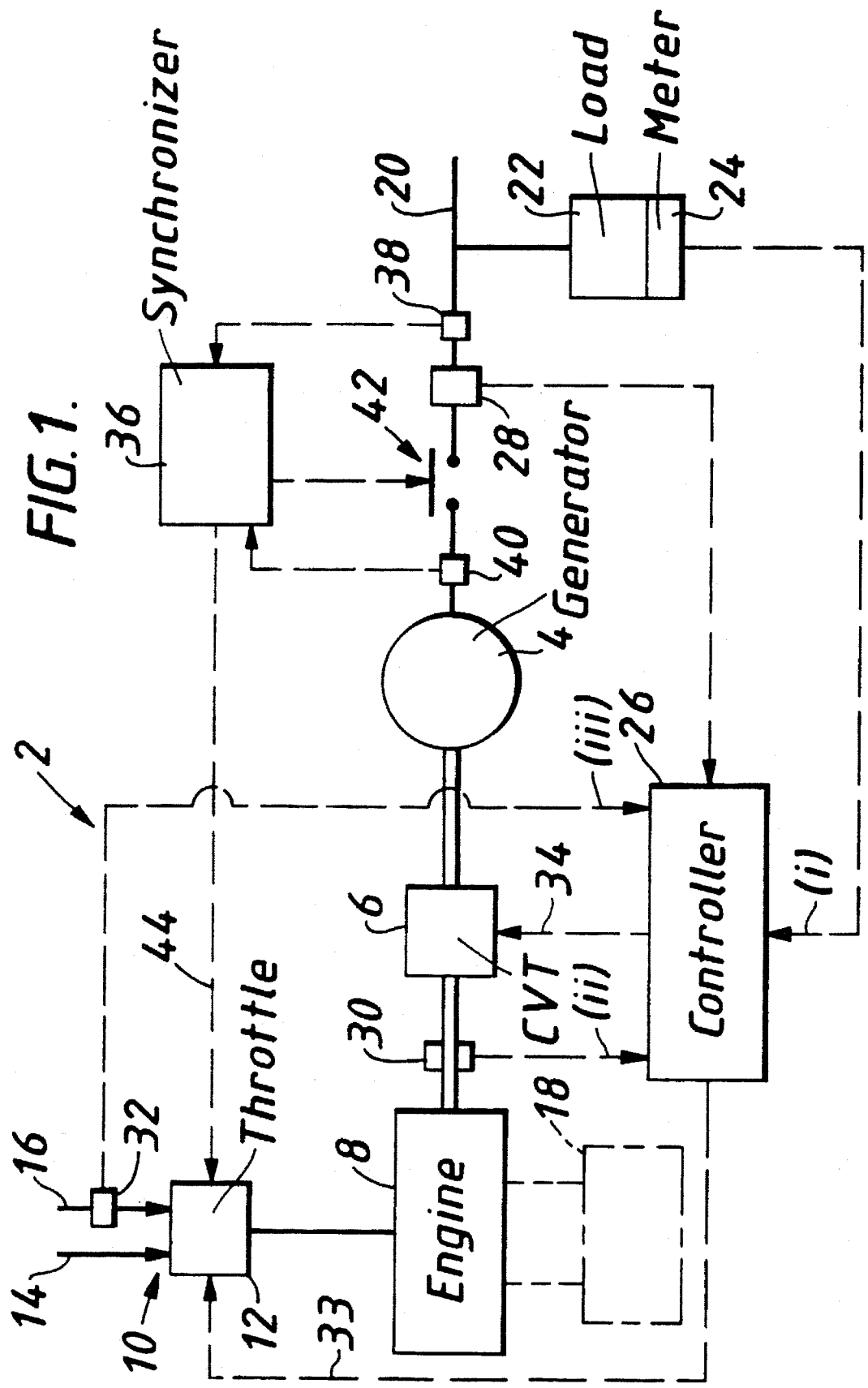
FIG. 1 is a diagrammatic representation of an electrical power generating arrangement formed according to the invention.

FIG. 1 shows an electrical power generating arrangement 2 in which an electrical power generator 4 is rotatably driven by rotary drive output from a continuously variable transmission 6 (known per se) into which rotary drive is input from a reciprocating internal combustion engine 8 so that the generator is driven by the engine.

The continuously variable transmission 6 (sometimes called a steplessly variable transmission) is of any suitable kind, examples of which are described in U.S. Pat. No. 5,098,345 (Van Doorne's Transmissie B. V.) and British Patent Specification GB 2 227 287A (Torotrak Development Ltd.) in which the ratio of the output speed of drive from the transmission to the input speed of the drive applied to the transmission is continuously and infinitely variable between predetermined high and low ratio limits.

The engine 8 is supplied with a controlled mixture of fuel and combustion air by any suitable fuel/air control means 10, for example a carburettor or fuel injection system (known per se); the aforesaid fuel air control means 10 comprising a throttle 12, a supply path 14 for combustion air (for example from atmosphere), and a supply path 16 for fuel. The fuel may be liquid, for example petrol or diesel oil, or maybe a fuel gas, for example natural gas, provided in known manner via a pressure regulator from which the gas emerges at a desired predetermined pressure for supply to the fuel/air control means 10.

The generating arrangement 2 may be part of a combined heat and power system (CHP) wherein heat generated by the engine 8 is extracted by heat exchange means 18 for some useful heating purpose, for example space and/or process heating. For example the heat exchange means 18 may extract heat from engine coolant, for example water, circulating in the engine cooling system and/or from hot exhaust gases from the engine.

Generating arrangement 2 can be connected to supply electrical power from the generator 4 into the electrical grid or mains 20 to which a load 22 is connected to be powered either by the mains or wholly or in part by the generating arrangement 2. The electrical circuit in which the load 22 is included also includes electrical power measuring or metering means 24 arranged to send a signal to controller 26 indicating the electrical power being demanded by the load 22.

Controller 26 comprises electronic apparatus comprising computer means. The controller 26 is also arranged to receive signals (i) from electrical power measuring or metering means 28 indicating the electrical power output from the generator 4, (ii) from rotary speed measuring means 30 indicating the rotational speed of the output drive from the engine 8, and (iii) from fuel measuring means 32 indicating the amount of fuel consumed in a given period of time. The controller 26 processes the aforesaid signals and is arranged to give output control signals on signal paths 33 and 34. The signals on path 33 actuate throttle operating means to vary the percentage the throttle is open. On path 34 the control signals thereon actuate transmission ratio varying means to vary the output gear ratio of the continuously variable transmission 6.

A synchroniser 36 (known per se) is also provided. The synchroniser 36 is arranged to receive signals from electrical power phase observing means 38 and 40 which observe the power phase of the electrical mains supply and the output from generator 4 respectively. Synchroniser 36 controls in known manner the opening and closing of electrical contact means 42 through which the generating arrangement 2 can be connected to the electrical mains 20.

Also the sychroniser 36 is arranged to provide signals on a signal path 44 to actuate the aforesaid throttle operating means.

Figure 2:
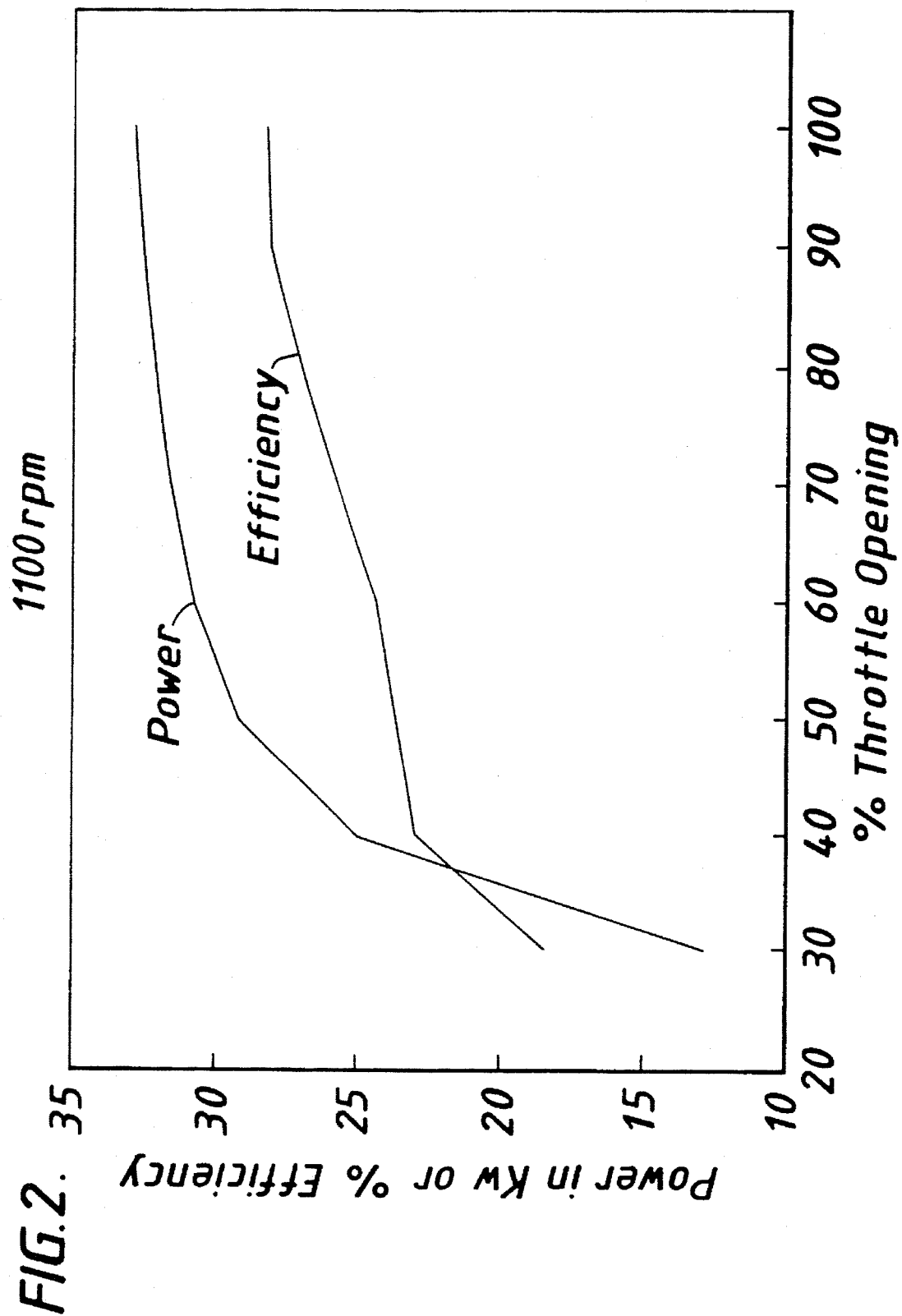
FIGS. 2, 3 and 4 show examples of graphs representing variation of engine efficiency plotted against variation of percentage throttle opening for an internal combustion engine of the kind used in the arrangement in FIG. 1 running at 1100 r.p.m., 1300 r.p.m. and 1500 r.p.m. respectively, or show examples of graphs representing variation of electrical power output in kilowatts from an electrical generator of the kind used in the arrangement in FIG. 1 plotted against variation of the percentage throttle opening for the said engine running at 1100, 1300 and 1500 r.p.m. respectively.
Figure 3:
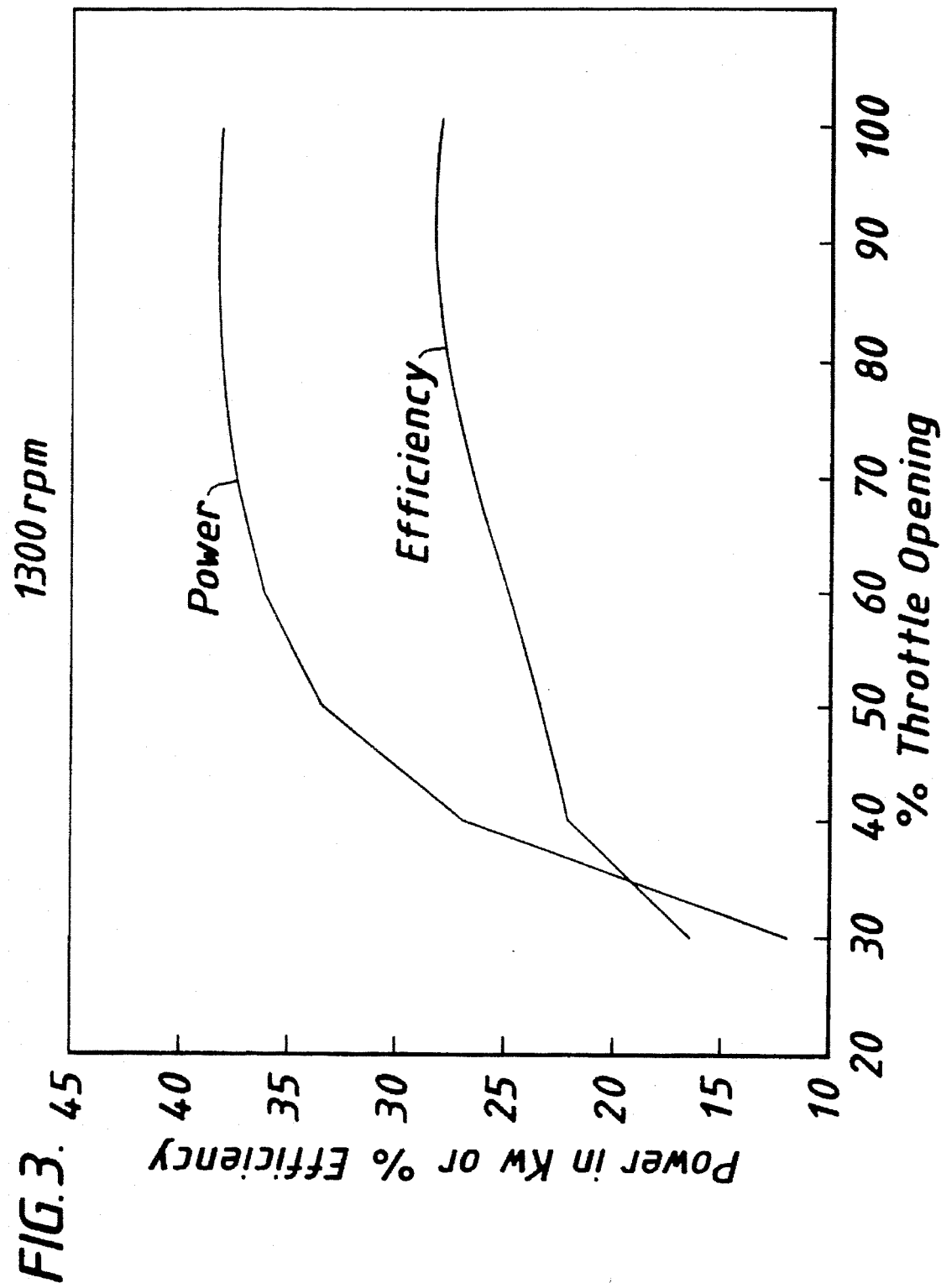
Figure 4:
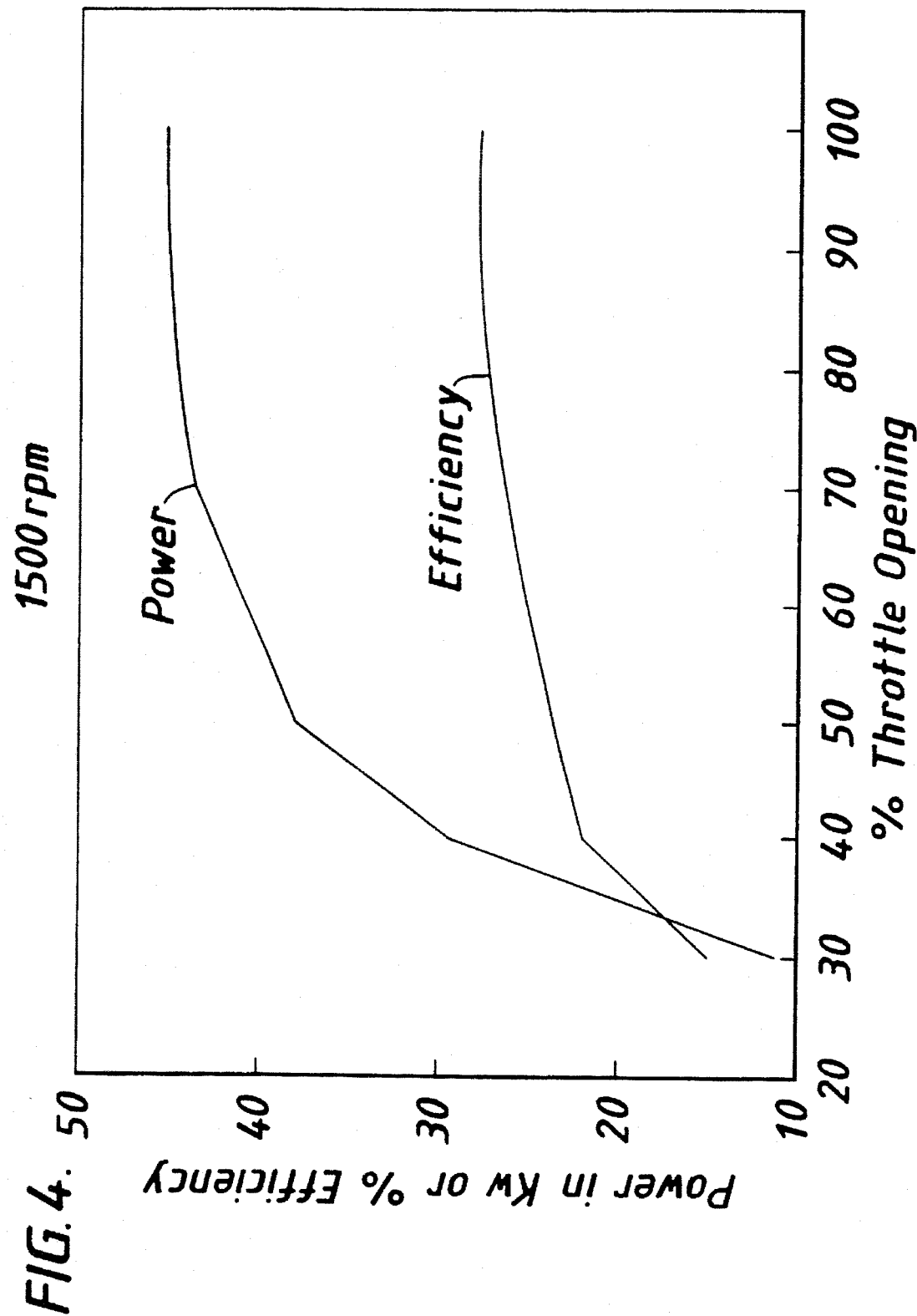

At the time of manufacture of the generating arrangement 2 or on site at, for example, the time that the generating arrangement 2 is being installed or at some other desired time, the arrangement is run at various fixed engine speeds as exemplified in FIGS. 2, 3 and 4 to obtain operating data, the gear ratio of the continuously variable transmission 6 being locked at a predetermined desired ratio. For example, the data can include the electrical power output from the generator 4 measured at different percentage openings of the throttle 12 and, at the same time, at those throttle openings the efficiency of the engine 8 is calculated using the expression:

$$\text{Efficiency} = \frac{\text{Shaft Power Output From Engine 8}}{\text{Fuel Power Input To Engine 8}} \times 100$$

where the shaft power output is the mechanical output power produced at the engine crank or output drive shaft. The value of the mechanical output power is obtained from measurements of electrical power output from the generator 4 under the assumption that the efficiency of the electrical generator is substantially constant at all operating conditions. The term "fuel power input" indicates the thermal energy released by complete combustion of the fuel consumed by the engine per unit time.

Figure 5:
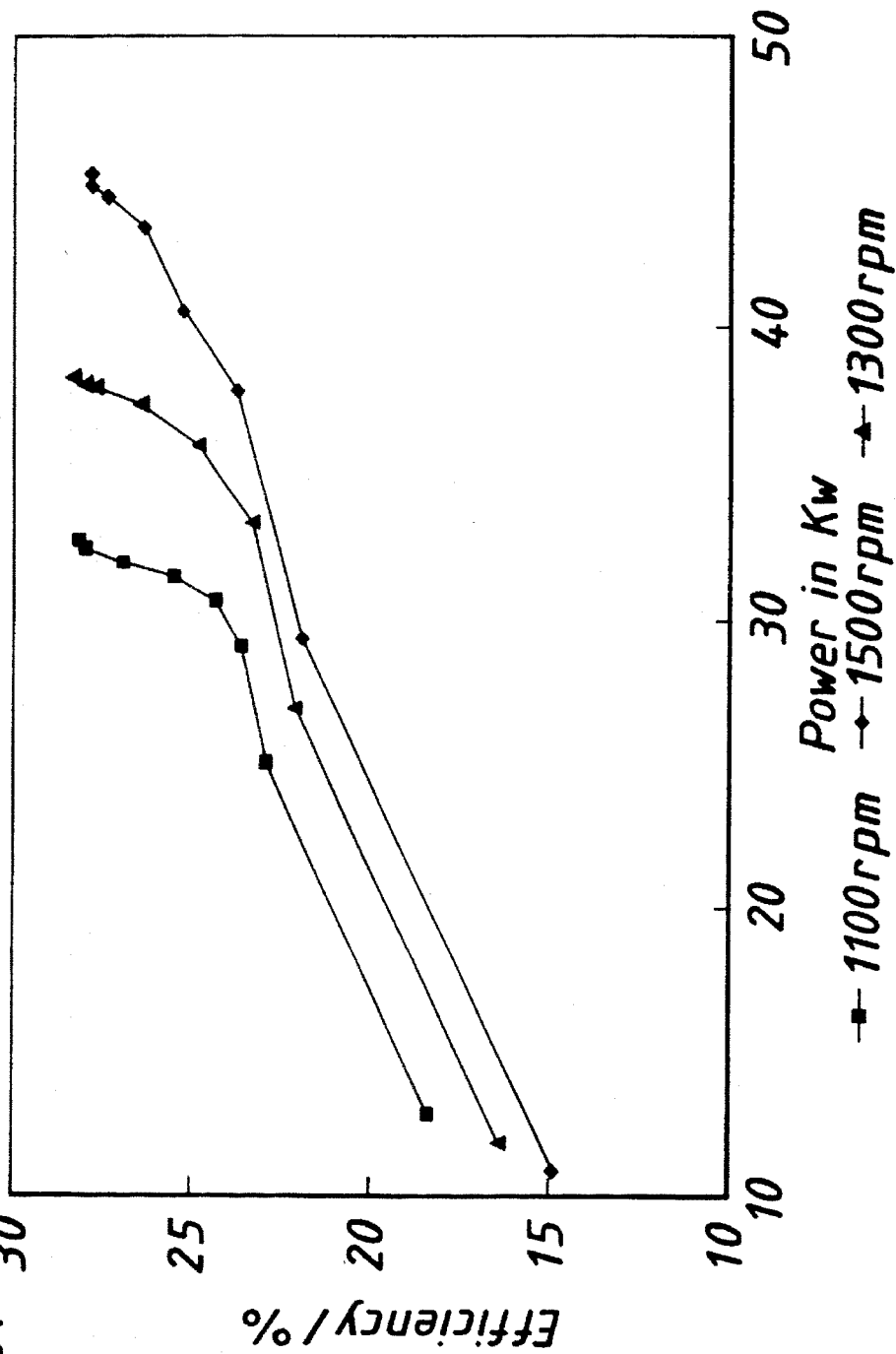
FIG. 5 shows a set of graphs of variation in the engine efficiency plotted against variation in the electrical power output from the electrical generator (derived from data used to produce FIGS. 2 to 4), when the engine is running at 1100, 1300, and 1500 r.p.m. respectively.

Such data can be used to produce graphs or maps of the efficiency at which the engine 8 operates at different engine speeds to drive the generator 4 to produce varying amounts of electrical power as exemplified by the graphs shown in FIG. 5. Looking at FIG. 5 it can be seen that if one wished to drive the generator 4 to produce 30 Kw of electrical power, then given the choice of running the engine 8 at 1100, 1300 or 1500 r.p.m., the most efficient speed at which to run the engine is 1100 r.p.m. at which the efficiency is substantially 24%, as compared with about 23% at 1300 r.p.m. and about 22% at 1500 r.p.m.

Using the aforesaid data it is possible to program the controller 26 with an engine map or look-up tables data as exemplified by the graph in FIG. 6 representing the engine speed at which the engine can be run with optimum efficiency to drive the generator 4 to produce a desired electrical power output.

When the generating arrangement 2 is generating electrical power which is synchronised with that of the mains 20 and can feed power into the mains through the closed contact means 42, the electrical generator 4 is rotating at a substantially constant speed set by the mains frequency and dominated to stay at constant speed by the mains power. For example, if the frequency of the mains is 50 HZ and the generator 4 is an AC three-phase four-pole generator (two N- and two S-poles) then the generator rotates at a fixed speed of 1500 r.p.m. e.g.

$$1500 \text{ r.p.m.} = \frac{50(\text{HZ}) \times 60(\text{seconds})}{2(N\text{- or }S\text{- poles})}$$

The power measuring means 24 continuously provides information telling the controller 26 what electrical power is being demanded by the load 22 at any instant, whilst the power measuring means 28 continuously provides information telling the controller 26 what the electrical power output from the generator 4 is. If there is a difference or error between the power demand and the generator output, the controller 26 operates to vary the generator output to meet the demand. Should the power demand at measuring means 24 drop below the output of the generator 4, the controller 26 consults the engine map (exemplified in FIG. 6) programmed therein to determine the new engine speed setpoint corresponding to the reduced power output required. The engine speed has to drop so the controller 26 signals the throttle actuating means to close the throttle 12. The ratio of the continuously variable transmission 6 is held substantially constant until the electrical power output from the generator 4 substantially equals the electrical power demand by load 22. Because the speed of rotation of the generator 4 is fixed and known, the controller 26 can calculate the new ratio needed for the continuously variable transmission 6 as the ratio of the new engine speed setpoint to the speed of the generator. When the power output from the generator 4 substantially equals the power demand of the load 22, the controller 26 signals the continuously variable transmission 6 to change to the calculated new ratio and the engine speed setpoint is changed within the controller 26 to the new value, so the controller signals the throttle operating means to open the throttle 12 and vary its opening to ensure that the power output from the generator 4 remains equal to the demand.

As a check to ensure the engine speed is equal to the setpoint speed, the controller 26 can observe the signals from the engine speed measuring means 30 and adjust the ratio of the continuously variable transmission 6 to ensure the desired engine speed.

If there is an increase in the load demand so that an error between the load power demand and the power output from the generator 4 occurs, then this time the engine speed must be increased. First the new engine speed setpoint is determined by the controller 26 consulting the engine map to find the engine speed corresponding to the increased power demand, and having determined the new engine speed the new ratio for the continuously variable transmission 6 is calculated by the controller which then causes the continuously variable transmission to change to the new ratio. Then the throttle 12 is opened by signals from the controller 26 to cause the power output from the generator 4 to increase to that being demanded by the load 22. Then the controller 26 controls the throttle 12 to ensure that the power output from the generator 4 remains equal to the demand.

At start up, when the contact means 42 is interrupted, the controller 26 signals the continuously variable transmission 6 and locks it at a desired, predetermined constant ratio. The synchroniser 36 observes the phase of the mains power and that of the output from the generator 4 and by means of signals on path 44 varies the opening of throttle 12 until the phase of the mains power and the phase of the output from the generator 4 are synchronised. Then the sychroniser 36 causes the contact means 42 to close to connect the power generating arrangement 2 to the mains 20. When the contact means 42 closes, control of the throttle 12 is adopted by the controller 26.

If desired, the controller 26 may be adapted to compensate for engine ageing or variation of its operating characteristics. Using the observation of the fuel measuring means 32 and the measured power output from the generator 4, the controller 26 can continuously calculate the instantaneous efficiency of the engine 8. The controller 26 can be programmed to vary the throttle opening and the ratio of the continuously variable transmission 6 to vary the engine speed, preferably slightly, about the engine speed setpoint derived using the engine map such as shown in FIG. 6. In this way the optimum efficiency of the engine 8 can be determined and the engine run at that optimum.

Preferably the power generating arrangement 2 has a minimum power output from the generator 4 which is less than the minimum demand by the load 22 and may have a maximum power output which matches or exceeds the likely maximum demand by the load. If the maximum demand is high a high performance high revving engine 8 may be used.

Or, alternatively, the system may be arranged so that the power output from the generator 4 may be a predetermined fraction of the power demanded by the load, provided, for example, the load demand is above a predetermined minimum and below a predetermined maximum. Above the predetermined maximum load demand, any extra demand is met by the mains without the generator 4 making an extra power output contribution. Below the predetermined minimum load demand, all the load can be met by the output from generator 4. In this system, because the generating arrangement 2 may only supply a predetermined portion of the total power demanded by the load above the predetermined minimum there is no need to run the engine 8 at high speed or full power for long periods. That predetermined portion or fraction may vary according to variation in the size of the power demand by the load.

We claim:

1. An electrical power generating arrangement for providing an electrical power output to be connected to electrical mains, said electrical power generating arrangement comprising a reciprocating internal combustion engine and an electrical power generator rotatably driven by rotary drive derived from said engine and applied to said generator through a drive line comprising a continuously variable transmission, the speed of said engine varying as a function of variation in electrical power output from the generator, said generator being driven at a substantially constant speed, control means being provided for varying the gear ratio of said continuously variable transmission, said control means being arranged for controlling opening and closing of a throttle means for regulating supply of fuel to said engine, said control means comprising computer means programmed with an engine map representing a function of variation of engine speed with variation in power output from said generator, said map being for consultation by said control means, when a variation in electrical power from said generator is required, to determine a new engine speed setpoint representing the engine speed at which said engine is run whilst said generator is providing the required output, and said control means being arranged for deriving a new gear ratio for said continuously variable transmission when a said new engine speed setpoint is determined.

2. An electrical power generating arrangement according to claim 1, wherein, if the electrical power output from the generator is to be reduced, said control means causes closure of said throttle means until the electrical power output from said generator drops to substantially a desired reduced value, whereupon the ratio of said continuously variable transmission is changed to a newly derived ratio and said throttle means is actuated to open and operate to maintain the power output from said generator at substantially said desired reduced value.

3. An electrical power generating arrangement according to claim 1, wherein, if the electrical power output from said generator is to be increased, said control means determines a new engine speed setpoint and causes change of the ratio of said continuously variable transmission to a new ratio, then said throttle means is opened causing the power output from said generator to increase to substantially a desired increased value, and said control means operates said throttle means to maintain the power output from said generator at substantially said desired increased value.

4. An electrical power generating arrangement according to claim 1, wherein means are provided for observing fuel consumption by said engine and electrical power output from said generator and producing data representative of said fuel consumption and electrical power output and said control means being adapted for using said data whereby said control means calculates the efficiency of said engine and causes variation of the opening of said throttle means and variation of the gear ratio of said continuously variable transmission to vary engine speed about the engine speed setpoint derived from said map.

5. An electrical power generating arrangement according to claim 1, wherein electrical power output from said generator is a function of the percentage opening of throttle means for regulating supply of fuel to said engine.

6. An electrical power generating arrangement according to claim 1, wherein the engine fuel is fuel gas.

7. A combined heat and power system comprising an electrical power generating arrangement according to claim 1.

\* \* \* \* \*